United States Patent [19]

Yamada et al.

[11] Patent Number: 5,574,119

[45] Date of Patent: Nov. 12, 1996

[54] THERMOPLASTIC RESIN FILM AND A METHOD FOR PRODUCING THE SAME

[75] Inventors: Toshirou Yamada; Chisato Nonomura, both of Ohtsu, Japan

[73] Assignee: Toyo Boseki Kabushiki Kaisha, Ohtsu, Japan

[21] Appl. No.: 376,250

[22] Filed: Jan. 23, 1995

Related U.S. Application Data

[62] Division of Ser. No. 135,852, Oct. 13, 1993, Pat. No. 5,411,695, which is a continuation of Ser. No. 890,366, May 26, 1992, abandoned, which is a continuation of Ser. No. 584,465, Sep. 18, 1990, abandoned.

[30] Foreign Application Priority Data

| Oct. 16, 1989 | [JP] | Japan | 1-269366 |
| Dec. 22, 1989 | [JP] | Japan | 1-333777 |
| Jan. 22, 1990 | [JP] | Japan | 2-13085 |
| Jul. 17, 1990 | [JP] | Japan | 2-189172 |

[51] Int. Cl.$^6$ ................................. B32B 27/34
[52] U.S. Cl. ..................... 528/310; 528/323; 428/98; 428/221
[58] Field of Search ..................... 528/323, 310; 428/98, 221

[56] References Cited

U.S. PATENT DOCUMENTS

| 4,698,195 | 10/1987 | Okumura et al. |
| 4,753,842 | 6/1988 | Okumura et al. ............ 428/220 |
| 5,024,799 | 6/1991 | Harp et al. |

FOREIGN PATENT DOCUMENTS

| 35-11774 | 10/1958 | Japan . |
| 50-073978 | 6/1975 | Japan . |
| 58-055221 | 4/1983 | Japan . |
| 58-215318 | 12/1983 | Japan . |
| 61-8326 | 1/1986 | Japan . |
| 61-199923 | 9/1986 | Japan . |
| 62-183327 | 8/1987 | Japan . |
| 62-43856 | 9/1987 | Japan . |
| 24459 | 5/1988 | Japan . |
| 1-25696 | 5/1989 | Japan . |
| 1-25694 | 5/1989 | Japan . |
| 1-165423 | 6/1989 | Japan . |

OTHER PUBLICATIONS

Dialog WPI Acc. No. 76–65659X/35 (no date).
Dialog WPI Acc. No. 86–312876/48 (no date).
Dialog WPI Acc No. 68–94458P/00 (no date).
Dialog WPI Acc. No. 83–28573K/12 (no date).
AGFA–Gevaert AG, "Biaxial Orient Polymer Film Reduce Anistrope Preparation Cooling Film After Stretch Rapid Heat Set," RD245023 (Oct. 9, 1984).
Nakayama, *Pol. Dig.* (Feb. 1984) 27–35 (translation).
Yamada, "New Film Membrane," (Jul. 25, 1990) 251–255 (translation).
Osaki, *J. App. Phys.* 64 (8) (1988) 4181.

*Primary Examiner*—Romulo H. Delmendo
*Attorney, Agent, or Firm*—Leydig, Voit & Mayer, Ltd.

[57] ABSTRACT

A thermoplastic resin film at least oriented in the transverse direction with minimized bowing phenomenon is provided. The thermal shrinkage stress in the transverse direction of the film satisfies the following formula I, and the thermal shrinkage factor of said film in the transverse direction at a temperature that is 40° C. higher than the glass transition temperature of said resin is 5% or less:

$$(\sigma_2/\sigma_1) \leq 1.0 \qquad (I)$$

wherein $\sigma_1$ is the thermal shrinkage stress (kg/mm$^2$) of the film in the transverse direction at a temperature that is 70° C. higher than the glass transition temperature of said resin, and $\sigma_2$ is the thermal shrinkage stress (kg/mm$^2$) of the said film in the transverse direction at a temperature that is 80° C. lower than the melting temperature of said resin.

4 Claims, 3 Drawing Sheets

THERMOPLASTIC RESIN FILM AND A METHOD FOR PRODUCING THE SAME

This is a divisional of application Ser. No. 08/135,852, filed on Oct. 13, 1993, now U.S. Pat. No. 5,411,695, which is a continuation of Ser. No. 07/890,366 filed May 26, 1992, now abandoned, which is a continuation of Ser. No. 07/584,465, filed Sep. 18, 1990, now abandoned.

BACKGROUND OF THE INVENTION

1. Field of the Invention

The present invention relates to a thermoplastic resin film possessing uniform physical and chemical properties in the transverse direction of the film. Furthermore, the present invention relates to a method for producing a thermoplastic resin film possessing uniform physical and chemical properties in the transverse direction by suppressing the bowing phenomenon which occurs in the process of transverse drawing.

2. Description of the Prior Art

Thermoplastic resin films, particularly, biaxially oriented polyester films, polyamide films, polyolefin films, polyvinyl resin films, polyethylene-sulfide films, etc., are used for packing as well as in various industrial and other applications.

In conventional methods for the manufacture of biaxially oriented films, the physical properties in the transverse (lateral) direction of the obtained films are generally nonuniform. This nonuniformity of films arises with particular frequency in transverse drawing processes. In transverse drawing processes, the film is drawn by holding both side margins of the film in a tenter with a clasping means such as clips and imparting tension in the transverse direction by successively shifting the clasping means. Ordinarily, this drawing process is followed by heat-setting, thereby obtaining a desired transversely drawn film. In this process, the side margins of the film are securely constrained by the clasping means, but in the central portion of the film, the effects of the clasping means are relatively small and the constraining force is accordingly weak. Consequently, when a long film is subjected to a transverse drawing by passing through a tenter, the central portion of the film is affected by the stress in the longitudinal direction generated by the transverse drawing and longitudinal movement of the film, or affected by the contraction stress generated by the heat-setting process. For example, in a case where drawing and heat-setting are performed consecutively in the same tenter, if straight lines are drawn on the surface of the film in the direction prior to entering the tenter, then these straight lines are first deformed, in the area where the drawing process commences, into a convex shape which is convex toward the direction of advance of the film, then, in the area immediately preceding the completion of the drawing process, the deformed lines are restored to recover their shape, and immediately after the completion of drawing, the lines are then deformed into a concave shape. Furthermore, at the beginning of an area of the heat-setting process, this concave deformation reaches a maximum, and thereafter these curves pass through the tenter without undergoing any further deformation, hence, the concave deformation remains after the film has emerged from the tenter. This phenomenon is known as bowing. This bowing phenomenon is the cause of the nonuniformity of physical properties in the transverse direction of the film.

Owing to the bowing phenomenon, the principal orientation axes near the two side margins of the film deviate toward the longitudinal axis considerably. That is, the angles of the orientation axes at the central and side marginal portions of the film tend to differ. Consequently, for example, the physical constants with respect to the longitudinal direction, such as the thermal shrinkage factor, thermal expansion factor, wet swelling factor, etc., are different in the central and in the side marginal portions of the film. In the applications of such films to packing or wrapping, various problems arise, e.g., the printing pitch deviates in processes such as printing, lamination or bag-making; blots appear on the surface of the film; the film curls or winds, etc. Moreover, as regards industrial applications, for example, when such films are used as the base films for floppy disks, anisotropy occurs within the surface and consequently various problems arise, such as deterioration of magnetic recording characteristics, etc.

Japanese Patent Publication No. 35-11774 discloses a method for the transverse drawing of thermoplastic resin films. The method comprises a relaxation process (i.e., substantially a cooling process) in the temperature range of 20° C. to 150° C. that is interposed between the transverse drawing and heat-setting processes. However, if this method is employed, the bowing phenomenon is still not reduced adequately. Japanese Laid-Open Patent Publication No. 50-73978 discloses a method for producing a stretched thermoplastic film for reducing the bowing phenomenon. In this method, a process for passing a film through a group of nip rolls is interposed between the drawing and heat-setting processes of the film. This Publication discloses that the temperature of this intermediate zone where the nip rolls are disposed should be equal to, or higher than the glass transition temperature of the thermoplastic resin film. However, at the point where the film comes into contact with the nip rolls (i.e., nip point), the rigidity of the film is low, therefore improvement with respect to the bowing phenomenon is not still adequate. Furthermore, in Japanese Patent Publication No. 63-24459, a method is proposed in which a film passes through a nip roll that is located in a middle portion of the film after the drawing process of the film, while the two side margins of the film are held so that only the central portion of the film is forcibly advanced. However, in this method, the nip roll is located in a high-temperature area within the tenter, and the roll and its peripheral devices must be cooled. Since the film temperature is high, the roll may damage the film, hence, the range of applicability of this method is restricted. Japanese Patent Publication No. 62-43856 discloses a method in which a film immediately after drawing is cooled to a temperature equal to or lower than the glass transition temperature of the film, and then multistage heat-setting is applied, while the drawing in the transverse direction is performed simultaneously with the heat-setting. However, this method comprises a complex array of processes including, in addition to a cooling process, a multistage heat-setting process and a redrawing process, and the stable regulation of the temperature within the tenter and film temperature over a long period of time is difficult. Japanese Laid-Open Patent Publication No. 62-183327 discloses a method in which longitudinal drawing of a film is performed, followed by transverse drawing in the tenter, and then heat-setting. In this procedure, the provision of a preheating zone between a transverse drawing zone and a heat-setting zone is proposed, wherein only the marginal portions of the film are preheated to a temperature equal to or higher than the glass transition temperature and equal to or lower than the heat-setting temperature. However, in this method, the temperature of the preheating zone must be regulated while maintaining a temperature gradient in the transverse direction, and therefore the regulation of the film temperature over a long period of time is difficult. Japanese Laid-Open Patent Publication No. 1-165423 discloses a method, in which a film, after transverse drawing, is cooled to a temperature equal to or lower than the transverse drawing temperature, and the film is redrawn in the transverse direction while raising the temperature in several stages. However, this method, like the method of the above-mentioned Japanese Patent Publication No. 62-43856, comprises a complex array of processes including, in addition to a cooling process, a multistage heat-setting process and a redrawing process, and the stable regulation of the temperature and film temperature within the tenter over a long period of time is difficult. Moreover, this patent Publication discloses that the length of the cooling zone should desirably be at least ½ the width of the film, but the reasons for this are not disclosed. Japanese Patent Publication Nos. 1-25694 and 1-25696 disclose a method, in which the direction of travel of a film is reversed at specified times when transverse drawing and heat-setting are performed. However, in this method, in order to reverse the direction of travel of the film, the film must be coiled onto a reel at a predetermined time during the process, and, since this is an off-line manufacturing method, the method involves various problems, such as limitations with respect to productivity, etc.

Thus, various procedures intended to reduce bowing have been proposed, but all of these proposals are concerned with manufacturing processes and apparatus, and hitherto no invention for this purpose has been realized through consideration of the characteristics of the film itself, such as molecular orientation, etc. In order to measure the degree of bowing on the basis of molecular orientation angles, as mentioned in Japanese Laid-Open Patent Publication Nos. 58-215318 and 61-8326, the molecular orientation angle must be measured along the entire width of the film in order to determine the degree of bowing. This is due to the fact that, in the central portion of the film, there is almost no deviation in the direction of the principal axis of molecular orientation, irrespective of the degree of bowing, therefore the assessment of the degree of bowing from the measurement of physical characteristics at an arbitrary location of the film is impossible.

SUMMARY OF THE INVENTION

The thermoplastic resin film of this invention, which overcomes the above-discussed and numerous other disadvantages and deficiencies of the prior art, is a thermoplastic resin film at least oriented in the transverse direction, wherein the thermal shrinkage stress in the transverse direction of the film satisfies the following formula I, and the thermal shrinkage factor of said film in the transverse direction at a temperature that is 40° C. higher than the glass transition temperature of the resin is 5% or less:

$$(\sigma_2/\sigma_1) \leq 1.0 \quad \text{(I)}$$

wherein $\sigma_1$ is the thermal shrinkage stress (kg/mm$^2$) of the film in the transverse direction at a temperature that is 70° C. higher than the glass transition temperature of the resin, and $\sigma_2$ is the thermal shrinkage stress (kg/mm$^2$) of the film in the transverse direction at a temperature that is 80° C. lower than the melting temperature of the resin.

The thermoplastic resin film of this invention is a thermoplastic resin film at least oriented in the transverse direction, wherein the molecular orientation angle in a marginal portion of the film, measured by microwave techniques, satisfies one of the following formulae II, III, and IV:

$$-90° < A \leq -60° \quad \text{(II)}$$

$$-30° \leq A \leq 30° \quad \text{(III)}$$

$$602° \leq A \leq 90° \quad \text{(IV)}$$

wherein A is a molecular orientation angle (°), said angle being measured with the longitudinal axis corresponding to 0° and clockwise rotation being regarded as positive.

The thermoplastic resin film of this invention is a thermoplastic resin film at least oriented in the transverse direction, wherein the difference between the molecular orientation angles at any different two points on a straight line in the transverse direction measured by microwave techniques satisfies the following formula V:

$$\Delta\theta_{or} \times w/wf \leq 64.0 \quad \text{(V)}$$

wherein $\Delta\theta_{or}$ is the difference of the molecular orientation angles (°) measured at the said two points, Wf is the distance (m) of the said points, and W is the width (m) of the film.

In a preferred embodiment, the thermoplastic resin is at least one selected from the group consisting of polyesters, polyamides, and polypropylenes.

The method for producing a thermoplastic resin film at least oriented in the transverse direction of this invention comprises the steps of drawing a thermoplastic resin film in the transverse direction in a drawing zone, cooling the said film to a temperature equal to or lower than the drawing temperature in a cooling zone, and heat-setting the said film in a heat-setting zone, wherein the length of the cooling zone satisfies the following formula VI:

$$(L/W) \leq 1.0 \quad \text{(VI)}$$

wherein L is the length (m) of the cooling zone, and W is the width (m) of the film after the drawing was carried out.

The method for producing a thermoplastic resin film of this invention comprises the steps of, drawing a thermoplastic resin film in the transverse direction in a drawing zone, cooling said film to a temperature equal to or lower than the glass transition temperature of the resin in a cooling zone, and heat-setting the said film in a heat-setting zone, wherein the said cooling zone is provided with a group of nip rolls, and the length of the cooling zone satisfies the following formula VII:

$$(L/W) \geq 0.25(2.0 - W_N/W)^2 \quad \text{(VII)}$$

wherein L is the length (m) of the cooling zone, W is the width (m) of the film, and $W_N$ (m) is the width (m) of the widest nip roll in the group of nip rolls.

In a preferred embodiment, the thermoplastic resin used for the above-mentioned thermoplastic resin material film is at least one selected from the group consisting of polyesters, polyamides, and polypropylenes.

In a preferred embodiment, the thermoplastic resin film of this invention is a biaxially oriented polyamide film, wherein the boiling water shrinkage distortion factors (%) at any different two points on a straight line in the transverse direction, and the molecular orientation angles at any different two points on a straight line in the transverse direction measured by microwave techniques satisfy the following formula VIII:

$$\Delta BS \times \Delta\theta_{or}/Wf^2 \leq 44.0 \tag{VIII}$$

wherein ΔBS is, in terms of absolute value, the difference between said boiling water shrinkage distortion factors (%) measured at the said two points; $\Delta\theta_{or}$ is the difference between the molecular orientation angles measured at the said two points, and Wf is the distance (m) between the points of measurement of the molecular orientation angle, said boiling water shrinkage distortion factor at each of the said points being the value obtained by measuring the boiling water shrinkage factors (%) at +45° and −45° from the longitudinal axis of the film clockwise rotation around the longitudinal axis being as positive, and subtracting said boiling water shrinkage factor in the −45° direction from the said factor in the +45° direction.

A method for producing a thermoplastic resin film of this invention comprises the steps of drawing a thermoplastic resin film in the transverse direction, and heat-setting said film, wherein said heat-setting process comprises at least one of the processes for shrinking said film in the transverse direction, and for blowing water vapor at a temperature of 95° C. or more.

The method for producing a thermoplastic resin film of this invention comprises the steps of, drawing a thermoplastic resin film in the longitudinal direction in a first drawing zone, drawing the said film in the transverse direction in a second drawing zone, and cooling the said biaxially drawn film at a temperature lower than the temperature of said drawing steps in a cooling zone, wherein the length of said cooling zone satisfies the following formula VI:

$$(L/W) \geq 1.0 \tag{VI}$$

wherein L is the length (m) of said cooling zone, and W is the width (m) of said film after the drawing in the transverse direction was carried out.

Thus, the invention described herein makes possible the objectives of:

(1) providing a thermoplastic resin film possessing uniform physical properties (including mechanical properties) and chemical properties in the transverse direction;

(2) providing a thermoplastic resin film possessing the aforesaid desirable characteristics and is highly suitable for use as wrapping or packing film; and (3) providing a method for producing a thermoplastic resin film possessing uniform physical and chemical properties in the transverse direction by suppressing the bowing phenomenon which occurs in the drawing process.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Figure 1:
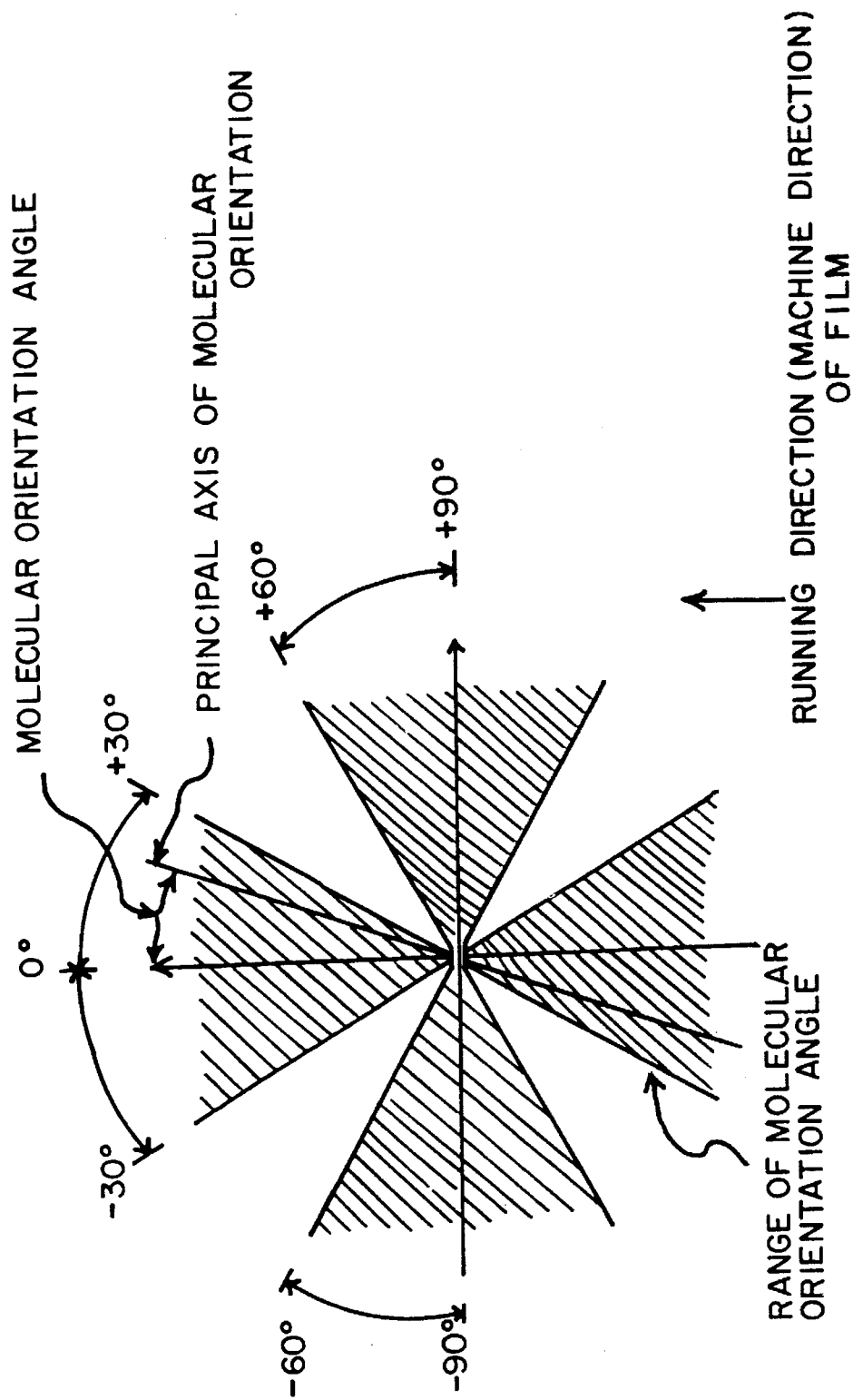
FIG. 1 shows the definition of molecular orientation angle of the thermoplastic resin film in one embodiment of the present invention.

In the following description, the present invention will be explained in detail.

Drawn or stretched thermoplastic resin film oriented at least in the transverse direction, as referred to in the description of the present invention, are films which have been drawn at least 2.5 times in the transverse direction, thereby imparting a molecular orientation. More specifically, these may be either biaxially oriented films obtained by transverse drawing of longitudinally drawn films (i.e., films which have previously been oriented in the lengthwise direction), or transverse uniaxially drawn films obtained by transverse orientation of essentially unoriented films. Alternatively, the said films may also be biaxially oriented films obtained by longitudinal drawing of transverse uniaxially oriented films. After drawing at least in the transverse direction, the aforesaid oriented films should desirably be heat treated at a temperature in the range of from the above-mentioned drawing temperature to a temperature 20° C. lower than the melting temperature of the said thermoplastic resin. In the present specification, the term "transverse direction of the film" refers to the direction perpendicular to the direction of travel of the film during the film manufacturing process.

In the thermoplastic resin films of the present invention, the thermal shrinkage stress satisfies the following formula I, and the thermal shrinkage factor in the transverse direction ($HS_{TD}$) is 5% or less:

$$(\sigma_2/\sigma_1) \leq 1.0 \tag{I}$$

wherein $\sigma_1$ is the thermal shrinkage stress (kg/mm²) of the film in the transverse direction at a temperature that is 70° C. higher than the glass transition temperature of the thermoplastic resin, and $\sigma_2$ is the thermal shrinkage stress (kg/mm²) of the film in the transverse direction at a temperature that is 80° C. lower than the melting temperature of the resin. The thermal shrinkage stresses $\sigma_1$ and $\sigma_2$ were measured by means of a Thermo-mechanical Analyzer (TM-3000), manufactured by the Shinku-Riko Inc. The thermal shrinkage factor in the transverse direction ($HS_{TD}$) of the film is the value (%) of the shrinkage in the transverse direction when the film has been maintained for 30 minutes at a temperature that is 40° C. higher than the glass transition temperature of the resin. The ratio $\sigma_2/\sigma_1$ should desirably not exceed 0.9. If the ratio $\sigma_2/\sigma_1$ exceeds 1.0, then the distortion of the film resulting from bowing will be large.

In general, the physical properties of the film are determined not only by the crystalline but also the non-crystalline portions of the film. In particular, the thermal shrinkage behavior of resin films is said to be largely governed by the non-crystalline portion. In the present invention, molecular orientation angles were measured with an apparatus for assessing the orientation of non-crystalline chains by means of microwaves, in order to determine the state of molecular orientation of resin films. As the apparatus, molecular orientation analyzer MOA-2, manufactured by the Kanzaki Paper Company, Ltd. was used. In a side marginal portion of the thermoplastic resin films of the present invention, the molecular orientation angle as measured by microwave techniques satisfies one of the following formulae II, III, and IV.

$$-90° < A \leq -50° \tag{II}$$

$$-30° \leq A \leq 30° \tag{III}$$

$$60° \leq A \leq 90° \quad \text{(IV)}$$

wherein A is a molecular orientation angle (°), the said angle being measured with the longitudinal axis corresponding to 0° and clockwise rotation being regarded as positive. That is, the angles A satisfying one of the above formulae II, III and IV are those lying in the sectors indicated by oblique shading in FIG. 1. A transversely drawn film included in the present invention satisfies one of the above-mentioned formulae II and IV. A biaxially drawn film included in the present invention satisfies one of the above-mentioned formulae II, III and IV. The side marginal portion of the thermoplastic resin film is defined as an area which occupies one-tenth of the width from one end toward the middle.

Also, in the thermoplastic resin films of the present invention, the difference between the molecular orientation angles at any different two points on a straight line in the transverse direction measured by microwave techniques satisfies the following formula V:

$$\Delta\theta_{or} \times w/wf \leq 64.0 \quad \text{(V)}$$

wherein $\Delta\theta_{or}$ is the difference of the molecular orientation angles (°) measured at the said two points, Wf is the distance (m) of the said points, and W is the width (m) of the said film.

The molecular orientation angle changes in an almost linear fashion from the central to the side marginal portion of the film. For example, when the molecular orientation angle in the central portion of the film is along the transverse direction, the molecular orientation angle deviates toward the longitudinal direction as the point of measurement approaches the side edge of the film. If the molecular orientation angles satisfy the foregoing condition, then the change of the molecular orientation angle over the entire width of the film is small, therefore the film can be regarded as displaying fairly uniform physical properties. Conversely, if the molecular orientation angles do not satisfy the foregoing condition, then the major orientation axis appreciably inclines locally, and anisotropy of physical properties arises. For example, assessment of the curling observed when the film was formed into a bag shape, regarded as an index of anisotropy, revealed that bags with relatively slight curl along the entire width of the film were obtained if films satisfying formula V were used.

The thermoplastic resins appropriate for use in the present invention include, for example, polyester resins such as polyethylene terephthalate, polyethylene 2, 6-naphthalate, polyethylene isophthalate, polybutylene terephthalate, etc.; polyamide resins such as Nylon 6, Nylon 6-6, etc.; polyolefine resins such as polypropylene, polyethylene, etc.; polyphenylene sulfides; polyether sulfones; polysulfones; polyetheretherketones; polyetherketoneketones; and polyethylenetrimellitateimide. Many other homopolymers, copolymers, polymer mixtures, or polymer complexes can be used. In particular, polyester resins, polyamide resins and polypropylene are especially appropriate for the present purpose.

In cases where polyamide films are used as the aforesaid thermoplastic resin films, the following conditions should be met. Namely the boiling water shrinkage distortion factors (%) at any different two points on a straight line in the transverse direction, and the molecular orientation angles at any different two points on a straight line in the transverse direction measured by microwave techniques satisfy the following formula VIII:

$$\Delta BS \times \Delta\theta_{or}/Wf^2 \leq 44.0 \quad \text{(VIII)}$$

wherein $\Delta BS$ is, terms of absolute value, the difference between the said boiling water shrinkage distortion factors (%) measured at the said two points; $\Delta\theta_{or}$ is, in terms of absolute value, the difference between the molecular orientation angles measured at the said two points, and Wf is the distance (m) between the points of measurement of the molecular orientation angle.

The boiling water shrinkage distortion factor at each of said points is the value obtained by measuring the boiling water shrinkage factors (%) at +45° and −45° from the longitudinal axis of the film clockwise rotation around the longitudinal axis being taken as a positive member of degrees, and subtracting said boiling water shrinkage factor in the −45° direction from said factor in the +45° direction.

The boiling water shrinkage factor is determined by the following method. A first and second lines are drawn through a given point on a sample film in the +45° and −45° direction, respectively. Next, the sample film is seasoned for 2 hours at standard conditions (i.e., 23° C., 50% RH). Then, the length of each reference line is measured and denoted by $l_0$ and $l_0'$, respectively. The sample film is immersed in boiling water (100° C.) for 30 minutes, and then subjected to seasoning at the standard conditions for 30 minutes. The length of each of the reference lines is measured, and denoted by $l_1$ and $l_1'$, respectively. The boiling water shrinkage factors in the +45° direction and −45° direction are calculated as follows, respectively:

$$\text{Boiling water shrinkage factor (\%) in the } +45° \text{ direction} = \frac{l_0 - l_1}{l_0} \times 100$$

$$\text{Boiling water shrinkage factor (\%) in the } -45° \text{ direction} = \frac{l_0' - l_1'}{l_0'} \times 100$$

The thermoplastic resin films of the present invention are manufactured by the following method. The method comprises the steps of heating a thermoplastic resin at a temperature that is higher than the melting temperature of the resin, thereby fusing the resin; extruding the resin in a film form from an extrusion device including a slit die onto a cooling drum; drawing the film in the longitudinal direction by means of a group of rollers with controllable speed; drawing the film in the transverse direction in a tenter, and, if necessary, subjecting the film to heat-setting. Finally, the film is reeled up with a device such as a film winder. In the process of the present invention, the conditions for film formation and drawing, i.e., the conditions of melting and extrusion of the resin, casting conditions, longitudinal drawing conditions, transverse drawing conditions, heat-setting conditions and winding conditions, etc., can be selected in a manner appropriate for the realization of the desired film characteristics.

In a preferred embodiment of the present invention, the thermoplastic resin film of this invention can be produced by the following method. The method comprises the step of a cooling process which is interposed between the transverse drawing and heat-setting processes. In the cooling step, the temperature of the film is lowered to a temperature equal to or lower than the drawing temperature, and the length of the cooling zone satisfies the following formula VI:

$$(L/W) \geq 1.0 \quad \text{(VI)}$$

wherein L is the length (m) of the cooling zone and W is the width (m) of the film after the transverse drawing was carried out. The length L of the cooling zone is a length that is set so that the temperature of the cooling zone is lower than that of the drawing zone, and the width of the drawn film passing through said cooling zone is 90% or more of the film before passing through said cooling zone. The width W of the film means the distance between a pair of tenter clips at the outlet of the tenter.

The value of L/W which is the ratio of the length L of the cooling zone to the film width W does not essentially depend upon the running speed of the film in the tenter. However, if the running speed increases, the film would move a longer distance until the film is cooled sufficiently. Hence, if the running speed of the film in the tenter is increased, then the ratio L/W should also be increased accordingly. For example, if the speed is increased by a factor of 2, then the value of the ratio L/W should desirably be increased to 1.5 times the value prior to the speed increase.

The larger the value of the ratio L/W is, the greater the efficacy in diminishing bowing phenomenon, and in fact, the length L of the cooling zone should desirably be selected so that L/W≧2.0, or, more preferably, L/W≧3.0.

The length L of the aforesaid cooling zone required in order to avoid the bowing phenomenon was determined by establishing a numerical model to which the finite element method could be applied, and estimating the drawing stress propagated from the marginal portion to the central portion of the film by numerical analysis. The values so calculated revealed that when the ratio L/W is 1.0, then the propagated drawing stress is approximately ½, compared with a case that the cooling process was not employed. If L/W is 2.0, then the propagated stress is approximately ⅒, and if L/W is 3.0, then the propagated stress is nearly zero. These numerical results were confirmed by experiments, which demonstrated that the numerically calculated estimates were appropriate in all cases.

As for the temperature of this cooling process, adequate efficacy is obtained when the temperature is lower than the drawing temperature. The lower the cooling temperature is, the greater the effect in reducing the degree of bowing, and in fact the selection of a cooling temperature lower than the glass transition temperature is preferable.

Furthermore, in the aforesaid cooling process, the reduction of bowing effects is even greater if the film is cooled without holding both side marginal portions. For example, the transverse drawing and heat-setting processes are conducted in separate tenters, and the film is cooled by allowing the said film to travel through the ambient atmosphere between the transverse drawing and heat-setting processes. In this case, if the length of the cooling zone is chosen so that L/W≧1.0, then excellent thermoplastic resin films with minimized bowing phenomenon can be obtained.

In another preferred embodiment of the present invention, the film should desirably be passed through a group of nip rolls with controllable speed, either during the cooling process or after the heat-setting process, or both. By the process mentioned above, the bowing phenomenon can be reduced effectively. The group of nip rolls should desirably be a combination a roll with metal mirror surfaces and a roll with rubber elastomer surfaces. Moreover, easy speed control of the rolls is necessary, since a difference between the speed of the nip rolls and that of the tenter clips may cause a tension in the film. Moreover, when a pair of nip rolls is employed, the speed of either one or both of each pair of nip rolls should desirably be controllable.

The cooling process should desirably be performed in a cooling zone equipped with a group of nip rolls, the length L of said cooling zone satisfying the following formula VII:

$$(L/W) \leqq 0.25(2.0 - W_N/W)^2 \qquad \text{(VII)}$$

wherein L is the length (m) of the cooling zone, W is the width (m) of the film after the transverse drawing, and $W_N$ is the width (m) of the widest nip roll in the group of nip rolls. The greater the width $W_N$, the more pronounced the effect in reduction of bowing, and the ratio $W_N/W$ of the width $W_N$ of the widest nip roll to the width W of the film should desirably be at least 0.2. If this ratio is less than 0.2, then reduction of bowing phenomenon is insufficient, and also shearing force is generated by the nip rolls, wrinkles occur, and productivity characteristics deteriorate. Either one pair or several pairs of nip rolls in common use may be employed as the nip rolls required for the present invention. Alternatively, a roll group composed of a combination of nip rolls and other types of rolls may be used for the present purpose. Also, a special type of roll described in Japanese Patent Application No. 60-255584 (Japanese Patent Publication No. 1-26769) may be used either singly or assembled into a group, or this special type of roll may be used in a group combined with nip rolls or other suitable types of rolls. The width $W_N$ of the widest nip roll refers to the width of the roll that comes into contact with the film. The length L of the cooling zone, the width W of the film and the width $W_N$ of the widest nip roll are to be expressed in the same units, ordinarily meters (m).

According to the method of the present invention, the transverse drawing process is executed in two or more drawing sections, and desirably, the temperature of the drawing sections are set progressively higher toward the cooling zone. Furthermore, the heat-setting process desirably comprises a first and second heat-setting processes. The first heat-setting process is carried out at a temperature in the range of 50° C. higher than the glass transition temperature to 20° C. lower than the melting temperature, while shrinking the said film by 0 to 10% in the transverse direction, and said second heat-setting process is carried out at a temperature in the range of 100° C. higher than said glass transition temperature to 20° C. lower than the melting temperature, while shrinking the said film by 0 to 10% in the longitudinal direction. The first heat-setting step is carried out by narrowing the width of the clips of the tenter by 0–10%, while the second heat-setting step is carried out by using a method such as passing the film through a nip roll with controllable speed in order to shrink the length of the film by 0–10%.

The following conditions are desirable when the thermoplastic resin film of the present invention is produced using a polyamide resin. Undrawn, uniaxially oriented or biaxially oriented polyamide films containing at least 1.0% by weight of water is used as a material film. The polyamide film should initially be drawn in the longitudinal direction, then drawn in the transverse direction, and then subjected to the aforesaid cooling process. In the heat-setting process, biaxially oriented polyamide films should be subjected to heat-setting while undergoing shrinkage in the longitudinal direction, or while undergoing heat treatment in steam at a temperature of at least 95° C. These two types of processing may also be applied simultaneously during the heat-setting process.

In the following, the present invention will be described in detail with reference to non-limiting examples.

EXAMPLES

Figure 2:
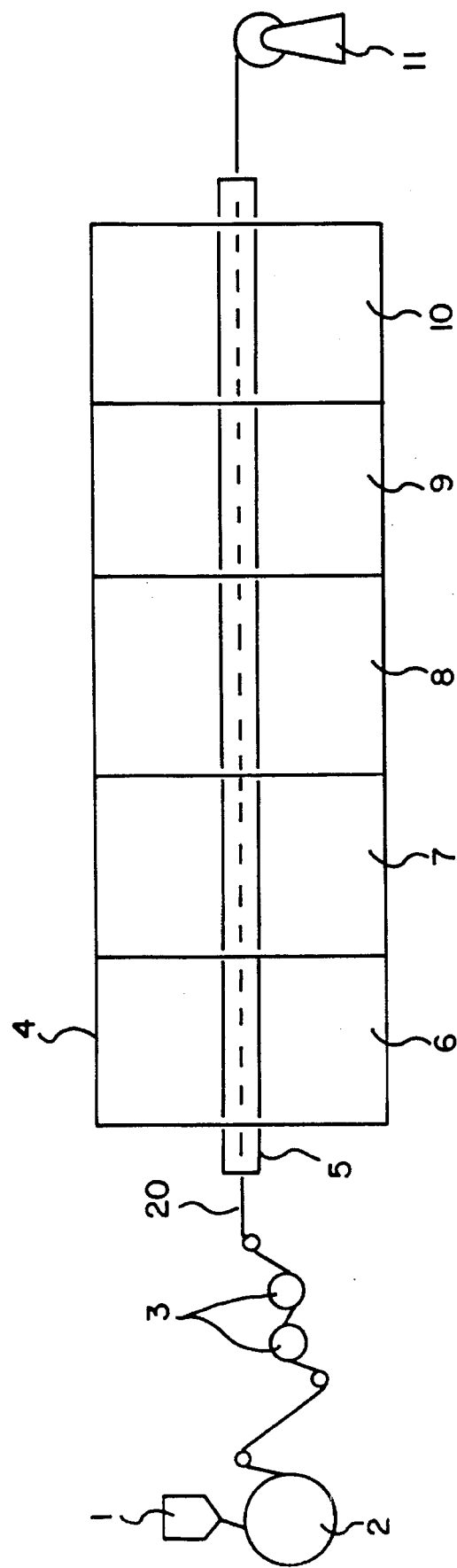
FIG. 2 shows an example of the apparatus for producing thermoplastic resin films of the present invention.

In the Examples and Comparative examples described below, thermoplastic resin films can be produced by using, for example, an apparatus shown in FIG. 2. First, a thermoplastic resin is extruded from a T-die 1, then abruptly cooled by the chill roll 2, thus forming a film 20. This film 20 is drawn in the longitudinal direction by the roll drawing machine 3, next, the side margins of the film 20 are gripped by clips 5 of the tenter 4, then the film 20 passes through a tenter 4 which comprises a preheating zone 6, transverse drawing zone 7, cooling zone 8, and heat-setting zones 9 and 10, as follows. First, the film passes through the preheating zone 6 and undergoes preliminary heat treatment, and is then transversely drawn in the transverse drawing zone 7. Next, the film 20 is cooled in the cooling zone 8 and then subjected to heat-setting in the two heat-setting zones 9 and 10. After this, the clip 5 is detached, then the film 20 emerges from the tenter and is taken up onto winder 11.

Figure 3:
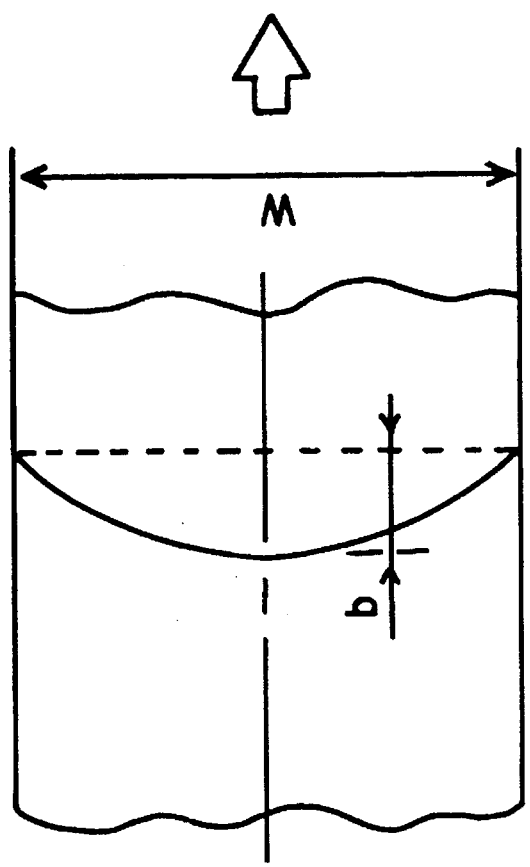
FIG. 3 shows a bowing distortion which occurs in the process of producing a stretched thermoplastic film.

In the following Examples and Comparative examples, the bowing distortion was measured as follows. First, a line traversing the entire film width was inscribed on the film surface prior to entering the tenter 4. As shown in FIG. 3, the line on the finally obtained film was deformed into bow-shaped curves, the bowing distortion B was calculated from the following equation:

$$B(\%) = b/w \times 100$$

wherein, W is the width (mm) of the film, and b is the maximum indentation (mm) of the bowing curve.

Example 1

Polyethylene terephthalate was melted and extruded from a T-die, and after forming into a film on a chill roll, drawn 3.6 times in the longitudinal direction with a roll drawing machine. Then the film was drawn 3.7 times in the transverse direction, and finally subjected to heat-setting treatment in a tenter, thereby obtaining a biaxially oriented polyethylene terephthalate film. The respective temperatures within the tenter were 90° C. for preheating, 100° C. for drawing, 55° C. for the subsequent cooling, and 220° C. for heat-setting. After further heat treatment at 200° C., the film was cooled to 100° C., removed from clips and then wound in the usual manner. In the present case, the ratio L/W of the length L of the cooling zone and the width W of the film was 1.0.

Example 2

A biaxially oriented polyethylene terephthalate film was obtained by the same procedure as in Example 1, except that in the present case the ratio L/W was 3.0.

Example 3

Polyethylene terephthalate was melted and extruded from a T-die, and after forming into a film on a chill roll, drawn 3.7 times in the transverse direction at 100° C. in a tenter. Then the film was drawn 3.6 times in the longitudinal direction with a roll drawing machine. The film was subjected to heat-setting treatment at 220° C. and further heat treatment at 200° C., and then cooled to 100° C. in another tenter, thereby obtaining a biaxially oriented polyethylene terephthalate film. Then the film was removed from clips and wound in the usual manner. In the present case, there was a substantial cooling process in which the film was cooled to a temperature of 65° C. or lower between the transverse drawing process and the heat-setting process, and the ratio L/W was 5.0 or more.

Comparative Example 1

A biaxially oriented polyethylene terephthalate film was obtained by the same procedure as in Example 1, except that in the present case there was no cooling process (i.e., L/W=0).

Comparative Example 2

A biaxially oriented polyethylene terephthalate film was obtained by the same procedure as in Example 1, except that in the present case the ratio L/W was 0.5.

Example 4

A nylon 6 resin was melted and extruded from a T-die, and after forming into a film on a chill roll, drawn 3.25 times in the longitudinal direction with a roll drawing machine. Then the film was drawn 3.5 times in the transverse direction, and finally subjected to heat-setting treatment in a tenter, thereby obtaining a biaxially oriented nylon 6 film. The respective temperatures within the tenter were 60° C. for preheating, 85° C. for drawing, 40° C. for the subsequent cooling, and 235° C. for heat-setting. After further heat treatment at 210° C., the film was cooled to 100° C., removed from clips and then wound in the usual manner. In the present case, the ratio L/W was 3.0.

Comparative Example 3

A biaxially oriented nylon 6 film was obtained by the same procedure as in Example 4, except that in the present case there was no cooling process (i.e., L/W=0).

Table 1 shows the ratio $(\sigma_2/\sigma_1)$ of thermal shrinkage stresses, the thermal shrinkage factor $(HS_{TD})$ in the transverse direction at a temperature that is 40° C. higher than the glass transition temperature of the resin, and the bowing distortion (B), of the films obtained in the above-mentioned Examples and Comparative Examples. The ratios $(\sigma_2/\sigma_1)$ of thermal shrinkage stresses and the thermal shrinkage factors $(HS_{TD})$ in the transverse direction in this table are those measured in the central portion of each film.

TABLE 1

| | Resin used for film | L/W | $\sigma_2/\sigma_1$ | $HS_{TD}$ (%) | Bowing distortion B (%) |
|---|---|---|---|---|---|
| Example 1 | Polyethylene terephthalate | 1.0 | 0.85 | 1.2 | 5.7 |
| Example 2 | Polyethylene terephthalate | 3.0 | 0.66 | 2.0 | 2.8 |
| Example 3 | Polyethylene terephthalate | 5.0 | 0.73 | 0.8 | 2.6 |
| Comparative Example 1 | Polyethylene terephthalate | 0.0 | 1.23 | 1.2 | 7.8 |
| Comparative Example 2 | Polyethylene terephthalate | 0.5 | 1.02 | 1.0 | 7.2 |
| Example 4 | Nylon 6 | 3.0 | 0.83 | 3.8 | 4.5 |
| Comparative Example 3 | Nylon 6 | 0.0 | 1.29 | 2.2 | 9.4 |

As shown in Table 1, the values of the ratio $(\sigma_2/\sigma_1)$ were greater than 1.0 in the films obtained in Comparative Examples 1 and 2, indicating a pronounced degree of bowing. On the other hand, thermoplastic resin films of the present invention obtained in Examples 1–4 displayed only slight bowing distortion, indicating highly uniform physical properties in the transverse direction.

Example 5

A polyethylene terephthalate resin was melted and extruded from a T-die, and after forming into a film on a chill roll, drawn 3.5 times in the longitudinal direction with a roll drawing machine. Then the film was drawn 3.6 times in the transverse direction, and finally subjected to heat-setting treatment in a tenter, thereby obtaining a biaxially oriented polyethylene terephthalate film. The respective temperatures within the tenter were 90° C. for preheating, 100° C. for drawing, 40° C. for the subsequent cooling, and 210° C. for heat-setting. The film was then wound in the usual manner. In the present case, the ratio L/W was 1.0.

Example 6

A biaxially oriented polyethylene terephthalate film was obtained by the same procedure as in Example 5, except that in the present case the ratio L/W was 2.0.

Example 7

A biaxially oriented polyethylene terephthalate film was obtained by the same procedure as in L/W was 3.0.

Example 8

A biaxially oriented polyethylene terephthalate film was obtained by the same procedure as in Example 5, except that in the present case the temperature of the cooling zone was 65° C.

Comparative Example 4

A biaxially oriented polyethylene terephthalate film was obtained by the same procedure as in Example 5, except that in the present case there was no cooling process (i.e., L/W=0).

Example 9

A nylon 6 resin was melted and extruded from a T-die, and after forming into a film on a chill roll, drawn 3.3 times in the longitudinal direction with a roll drawing machine. Then the film was drawn 3.4 times in the transverse direction, and finally subjected to heat-setting treatment in a tenter, thereby obtaining a biaxially oriented nylon 6 film. The respective temperatures within the tenter were 60° C. for preheating, 85° C. for drawing, 40° C. for the subsequent cooling, and 225° C. for heat-setting. The film was then wound in the usual manner. In the present case, the ratio L/W was 1.0.

Example 10

A biaxially oriented nylon 6 film was obtained by the same procedure as in Example 9, except that in the present case the ratio L/W was 2.0.

Example 11

A biaxially oriented nylon 6 film was obtained by the same procedure as in Example 9, except that in the present case the ratio L/W was 3.0.

Comparative Example 5

A biaxially oriented nylon 6 film was obtained by the same procedure as in Example 9, except that in the present case there was no cooling process (i.e., L/W=0).

Table 2 shows the film-producing conditions in the above-mentioned Examples and Comparative Examples, a parameter of molecular orientation angle $\Delta\theta_o \times W/W_f$ of the obtained film and the size of curling observed when the films were formed into bags.

TABLE 2

| | Resin used for film | Cooling temperature (°C.) | L/W | $\Delta\theta$ or $\times$ W/W$_f$ (°) | Size of curling[1] |
|---|---|---|---|---|---|
| Example 5 | Polyethylene terephthalate | 40 | 1.0 | 52.0 | N |
| Example 6 | Polyethylene terephthalate | 40 | 2.0 | 27.0 | N |
| Example 7 | Polyethylene terephthalate | 40 | 3.0 | 22.9 | N |
| Example 8 | Polyethylene terephthalate | 65 | 1.0 | 62.4 | N–M |
| Comparative Example 4 | Polyethylene terephthalat | — | — | 83.2 | L |
| Example 9 | Nylon 6 | 40 | 1.0 | 62.2 | N–M |
| Example 10 | Nylon 6 | 40 | 2.0 | 53.0 | N |
| Example 11 | Nylon 6 | 40 | 3.0 | 46.1 | N |
| Comparative Example 5 | Nylon 6 | — | — | 96.8 | L |

[1]N: No curling  M: Middle size  L: Large size

As clearly shown in Table 2, the thermoplastic resin films of Comparative Examples displayed large variations of molecular orientation angle in the transverse direction and a large degree of curling occurred when the films were formed into bags. On the other hand, the thermoplastic resin films of the present invention possessed uniform physical properties in the transverse direction (only little variation in molecular orientation angle along the transverse direction) and only slight curling occurred when formed into bags.

Example 12

A nylon 6 resin was melted and extruded from a T-die, and after forming into a film on a chill roll, drawn 3.25 times in the longitudinal direction with a roll drawing machine. Then the film was drawn 3.5 times in the transverse direction with a tenter, and finally subjected to heat-setting treatment, thereby obtaining a biaxially oriented nylon 6 film. The respective temperatures within the tenter were 60° C. for preheating, 85° C. for drawing, 40° C. for the subsequent cooling, and 220° C. for heat-setting. After further heat treatment at 210° C., the film was cooled to 100° C., removed from clips and then wound in the usual manner. In the present case, the ratio L/W was 1.0.

Example 13

A biaxially oriented nylon 6 film was obtained by the same procedure as in Example 12, except that in the present case the ratio L/W was 2.0.

Example 14

A biaxially oriented nylon 6 film was obtained by the same procedure as in Example 12, except that in the present case the ratio L/W was 3.0.

Example 15

The biaxially oriented nylon 6 film obtained in Example 13 was further provided to a pair of rolls at 195° C., allowing the film to shrink by 5% in the longitudinal direction, thereby obtaining a biaxially oriented nylon 6 film.

Example 16

A biaxially oriented nylon 6 film was obtained by the same procedure as in Example 12, except that in the present case the substantially undrawn film was immersed in water before drawing in the longitudinal direction.

Example 17

A biaxially oriented nylon 6 film was obtained by the same procedure as in Example 12, except that in the present case the uniaxially oriented film was immersed in water before drawing in the transverse direction.

Example 18

The biaxially oriented nylon 6 film obtained in Example 17 was further allowed to shrink by 8% in the longitudinal direction with rolls, thereby obtaining a biaxially oriented nylon 6 film.

Example 19

A biaxially oriented nylon 6 film was obtained by the same procedure as in Example 12, except that in the present case the temperature of the cooling zone was 80° C.

Example 20

A biaxially oriented nylon 6 film was obtained by the same procedure as in Example 14, except that in the present case the temperature of the cooling zone was 80° C.

Example 21

A biaxially oriented nylon 6 film was obtained by the same procedure as in Example 13, except that in the present case the temperature of the cooling zone was 80° C. and the biaxially oriented nylon 6 film so obtained was further allowed to shrink in the longitudinal direction with rolls.

Example 22

A biaxially oriented nylon 6 film was obtained by the same procedure as in Example 18, except that in the present case the film was heat-treated with water vapor of 95° C. or more while shrinking the film in the longitudinal direction with rolls.

Comparative Example 6

A biaxially oriented nylon 6 film was obtained by the same procedure as in Example 18, except that in the present case, neither the cooling process nor the shrinking process in the longitudinal direction was employed (i.e., L/W=0).

Table 3 shows the parameter $\Delta BS \cdot \Delta\theta_o/Wf^2$ relating to the boiling water shrinkage distortion factor and molecular orientation angle of the films obtained in the above-mentioned Examples and Comparative Example, as well as the degree of printing misalignment observed after marks had been printed onto the said films.

TABLE 3

| | Water content of film (%) | | Cooling conditions | | Shrinking ratio in longitudinal direction (%) | $\Delta BS \cdot \Delta\theta_o/W_f^2$ (% · deg/m²) | Printing[2] misalignment |
|---|---|---|---|---|---|---|---|
| | Undrawn film | Uniaxially oriented film | Temperature (°C.) | L/W | | | |
| Example 12 | <1% | <1% | 40 | 1.0 | 0% | 20.8 | N |
| Example 13 | <1% | <1% | 40 | 2.0 | 0% | 14.6 | N |
| Example 14 | <1% | <1% | 40 | 3.0 | 0% | 11.0 | N |
| Example 15 | <1% | <1% | 40 | 2.0 | 5% | 7.6 | N |
| Example 16 | 9.1% | 1.6% | 40 | 1.0 | 0% | 18.4 | N |
| Example 17 | <1% | 8.6% | 40 | 1.0 | 0% | 16.4 | N |
| Example 18 | <1% | 8.6% | 40 | 1.0 | 8% | 10.2 | N |
| Example 19 | <1% | <1% | 80 | 1.0 | 0% | 44.0 | A |
| Example 20 | <1% | <1% | 80 | 3.0 | 0% | 37.6 | N-A |
| Example 21 | <1% | <1% | 80 | 2.0 | 6% | 17.4 | N |
| Example 22[1] | <1% | 8.6% | 40 | 1.0 | 8% | 9.2 | N |
| Comparative Example 6 | <1% | <1% | — | — | 0% | 48.4 | S |

[1] The film obtained in Example 18 was heat-treated with water vapor while shrinking in the longitudinal direction.
[2] N: negligible, A: appreciable, S: substantial.

As clearly shown in Table 3, the thermoplastic resin films of the present invention exhibited small values of the parameter $\Delta BS \cdot \Delta\theta_o/Wf^2$, and after printing, almost no printing misalignment was observed on these films. By contrast, the thermoplastic resin films of the Comparative Example displayed large values of $\Delta BS \cdot \Delta\theta_o/W_f^2$ as well as large printing misalignment, indicating nonuniform physical properties in the transverse direction.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A biaxially oriented polyamide film, wherein the boiling water shrinkage distortion factors (%) at any different two points on a straight line in the transverse direction, and the molecular orientation angles at any different two points on a straight line in the transverse direction measured by microwave techniques satisfy the following formula VIII:

$$\Delta BS \times \Delta\Theta_{or}/Wf^2 \leq 44.0 \quad \text{(VIII)}$$

wherein ΔBS is, in terms of absolute value, the difference between said boiling water shrinkage distortion factors (%) measured at said two points; $\Delta\Theta_{or}$ is, in terms of absolute value, the difference between said molecular orientation angles measured at said two points, and Wf is the distance (m) between the points of measurement of said molecular orientation angle, said boiling water shrinkage distortion factor at each of said points being the value obtained by measuring the boiling water shrinkage factors (%) at +45° and −45° from the longitudinal axis of the film, clockwise rotation around the longitudinal axis being regarded as positive, and subtracting said boiling water shrinkage factor in the −45° direction from said factor in the +45° direction, and wherein the polyamide film has a thermal shrinkage factor in the transverse direction measured at a temperature that is 40° C. higher than the glass transition temperature of the polyamide of 3.8% or less.

2. A biaxially oriented polyamide film wherein the thermal shrinkage stress in the transverse direction of said film satisfies the following formula I, and the thermal shrinkage factor of said film in the transverse direction at a temperature that is 40° C. higher than the glass transition temperature of said resin is 5% or less:

$$(\sigma_2/\sigma_1) \leq 1.0 \quad \text{(I)}$$

wherein $\sigma_1$ is the thermal shrinkage stress (kg/mm$^2$) of said film in the transverse direction at a temperature that is 70° C. higher than the glass transition temperature of said resin, and $\sigma_2$ is the thermal shrinkage stress (kg/mm$^2$) of said film in the transverse direction at a temperature that is 80° C. lower than the melting temperature of said resin, and wherein the boiling water shrinkage distortion factors (%) at any different two points on a straight line in the transverse direction, and the molecular orientation angles at any different two points on a straight line in the transverse direction measured by microwave techniques satisfy the following formula VIII:

$$\Delta BS \times \Delta\Theta_{or}/Wf^2 \leq 44.0 \quad \text{(VIII)}$$

wherein ΔBS is, in terms of absolute value, the difference between said boiling water shrinkage distortion factors (%) measured at said two points; $\Delta\Theta_{or}$ is, in terms of absolute value, the difference between said molecular orientation angles measured at said two points, and Wf is the distance (m) between the points of measurement of said molecular orientation angle, said boiling water shrinkage distortion factor at each of said points being the value obtained by measuring the boiling water shrinkage factors (%) at +45° and −45° from the longitudinal axis of the film, clockwise rotation around the longitudinal axis being regarded as positive, and subtracting said boiling water shrinkage factor in the −45° direction from said factor in the +45° direction, and wherein the polyamide film has a thermal shrinkage factor in the transverse direction measured at a temperature that is 40° C. higher than the glass transition temperature of the polyamide of 3.8% or less.

3. A biaxially oriented polyamide film wherein the molecular orientation angle in a marginal portion of said film, measured by microwave techniques, satisfies one of the following formulas II, III, and IV:

$$-90° < A \leq -60° \quad \text{(II)}$$

$$-30° \leq A \leq 30° \quad \text{(III)}$$

$$60° \leq A \leq 90° \quad \text{(IV)}$$

wherein A is a molecular orientation angle (°), said angle being measured with the longitudinal axis corresponding to 0° and clockwise rotation being regarded as positive, and wherein the boiling water shrinkage distortion factors (%) at any different two points on a straight line in the transverse direction, and the molecular orientation angles at any different two points on a straight line in the transverse direction measured by microwave techniques satisfy the following formula VIII:

$$\Delta BS \times \Delta\Theta_{or}/Wf^2 \leq 44.0 \quad \text{(VIII)}$$

wherein ΔBS is, in terms of absolute value, the difference between said boiling water shrinkage distortion factors (%) measured at said two points; $\Delta\Theta_{or}$ is, in terms of absolute value, the difference between said molecular orientation angles measured at said two points, and Wf is the distance (m) between the points of measurement of said molecular orientation angle, said boiling water shrinkage distortion factor at each of said points being the value obtained by measuring the boiling water shrinkage factors (%) at +45° and −45° from the longitudinal axis of the film, clockwise rotation around the longitudinal axis being regarded as positive, and subtracting said boiling water shrinkage factor in the −45° direction from said factor in the +45° direction, and wherein the polyamide film has a thermal shrinkage factor in the transverse direction measured at a temperature that is 40° C. higher than the glass transition temperature of the polyamide of 3.8% or less.

4. A biaxially oriented polyamide film wherein the difference between the molecular orientation angles at any different two points on a straight line in the transverse direction measured by microwave techniques satisfies the following formula V:

$$\Delta\Theta_{or} \times W/Wf < 64.0 \quad \text{(V)}$$

wherein $\Delta\Theta_{or}$ is the difference of the molecular orientation angles (°) measured at said two points, Wf is the distance (m) of said points, and W is the width (m) of said film, and wherein the boiling water shrinkage distortion factors (%) at any different two points on a straight line in the transverse direction, and the molecular orientation angles at any different two points on a straight line in the transverse direction measured by microwave techniques satisfy the following formula VIII:

$$\Delta BS \times \Delta\Theta_{or}/Wf^2 \leq 44.0 \qquad \text{(VIII)}$$

wherein ΔBS is, in terms of absolute value, the difference between said boiling water shrinkage distortion factors.(%) measured at said two points; $\Delta\Theta_{or}$ is, in terms of absolute value, the difference between said molecular orientation angles measured at said two points, and Wf is the distance (m) between the points of measurement of said molecular orientation angle, said boiling water shrinkage distortion factor at each of said points being the value obtained by measuring the boiling water shrinkage factors (%) at +45° and −45° from the longitudinal axis of the film, clockwise rotation around the longitudinal axis being regarded as positive, and subtracting said boiling water shrinkage factor in the −45° direction from said factor in the +45° direction, and wherein the polyamide film has a thermal shrinkage factor in the transverse direction measured at a temperature that is 40° C. higher than the glass transition temperature of the polyamide of 3.8% or less.

\* \* \* \* \*

UNITED STATES PATENT AND TRADEMARK OFFICE
CERTIFICATE OF CORRECTION

PATENT NO. : 5,574,119
DATED : November 12, 1996
INVENTOR(S) : Yamada et al.

It is certified that error appears in the above-identified patent and that said Letters Patent is hereby corrected as shown below:

ON THE TITLE PAGE:
[73] Assignee: "Toyo Boseki Kabushiki Kaisha, Ohtsu, Japan" should read --Toyo Boseki Kabushiki Kaisha, Osaka, Japan--.

In Column 4, line 36: "$\leq$" should read --$\geq$--.
In Column 6, line 65: "-50°" should read -- -60° --.
In Column 10, line 3: "$\leq$" should read --$\geq$--.

IN THE CLAIMS:
In Column 18, line 11: after "A" insert --$\leq$--.
In Column 18, line 26: after "Δ" delete -(--.

Signed and Sealed this

Eleventh Day of November, 1997

Attest:

BRUCE LEHMAN

Attesting Officer    Commissioner of Patents and Trademarks